United States Patent
Özer et al.

(10) Patent No.: US 8,195,886 B2
(45) Date of Patent: Jun. 5, 2012

(54) DATA PROCESSING APPARATUS AND METHOD FOR IMPLEMENTING A REPLACEMENT SCHEME FOR ENTRIES OF A STORAGE UNIT

(75) Inventors: Emre Özer, Cambridge (GB); Stuart David Biles, Little Thurlow (GB)

(73) Assignee: ARM Limited, Cambridge (GB)

( * ) Notice: Subject to any disclaimer, the term of this patent is extended or adjusted under 35 U.S.C. 154(b) by 824 days.

(21) Appl. No.: 11/723,189

(22) Filed: Mar. 16, 2007

(65) Prior Publication Data
US 2008/0229052 A1 Sep. 18, 2008

(51) Int. Cl.
*G06F 12/12* (2006.01)
(52) U.S. Cl. .............. 711/133; 711/159; 711/E12.075
(58) Field of Classification Search .............. None
See application file for complete search history.

(56) References Cited

U.S. PATENT DOCUMENTS

| | | | |
|---|---|---|---|
| 5,535,361 A * | 7/1996 | Hirata et al. ............... | 711/145 |
| 6,996,678 B1 * | 2/2006 | Sharma ........................ | 711/133 |
| 7,502,890 B2 * | 3/2009 | Kailas et al. ................ | 711/133 |
| 2002/0188809 A1 * | 12/2002 | Kershaw .................... | 711/133 |
| 2005/0114605 A1 * | 5/2005 | Iyer ............................. | 711/133 |
| 2005/0160228 A1 * | 7/2005 | Teruyama .................. | 711/133 |
| 2006/0149891 A1 * | 7/2006 | Rudelic ...................... | 711/103 |
| 2007/0050594 A1 * | 3/2007 | Augsburg et al. ......... | 711/207 |
| 2007/0067556 A1 * | 3/2007 | Dixon et al. ............... | 711/106 |
| 2008/0040554 A1 * | 2/2008 | Zhao et al. ................. | 711/133 |

* cited by examiner

*Primary Examiner* — Edward Dudek, Jr.
*Assistant Examiner* — Ryan Dare
(74) *Attorney, Agent, or Firm* — Nixon & Vanderhye P.C.

(57) ABSTRACT

A data processing apparatus and method are provided for implementing a replacement scheme for entries of a storage unit. The data processing apparatus has processing circuitry for executing multiple program threads including at least one high priority program thread and at least one lower priority program thread. A storage unit is then shared between the multiple program threads and has multiple entries for storing information for reference by the processing circuitry when executing the program threads. A record is maintained identifying for each entry whether the information stored in that entry is associated with a high priority program thread or a lower priority program thread. Replacement circuitry is then responsive to a predetermined event in order to select a victim entry whose stored information is to be replaced. To achieve this, the replacement circuitry performs a candidate generation operation to identify a plurality of randomly selected candidate entries, and then references the record in order to preferentially select as the victim entry a candidate entry whose stored information is associated with a lower priority program thread. This improves the performance of the high priority program thread(s) by preferentially evicting from the storage unit entries associated with lower priority program threads.

18 Claims, 10 Drawing Sheets

DATA PROCESSING APPARATUS AND METHOD FOR IMPLEMENTING A REPLACEMENT SCHEME FOR ENTRIES OF A STORAGE UNIT

BACKGROUND OF THE INVENTION

1. Field of the Invention

The present invention relates to a data processing apparatus and method for implementing a replacement scheme for entries of a storage unit, and in particular to a technique for selecting a victim entry of a storage unit whose stored information is to be replaced.

2. Description of the Prior Art

Within a data processing apparatus, there will typically be various storage units that comprise multiple entries for storing information referenced by processing circuitry of the data processing apparatus when that processing circuitry is executing sequences of instructions. One example of such a storage unit would be a cache for storing instructions to be executed by the processing circuitry and/or data used by the processing circuitry when executing such instructions. The cache may be a unified cache storing both instructions and data, or may take the form of a separate instruction cache for storing instructions and a separate data cache for storing data. When an instruction needs to be fetched for subsequent execution by the processing circuitry, or data needs to be accessed by the processing circuitry (for either a write or a read operation), then a lookup operation will be performed in the relevant cache to seek to determine whether that instruction or data is present in the cache, and if so the fetch or access operation can proceed with respect to the contents of the cache. However, if the instruction or data is not in the cache, then a linefill operation is typically performed to retrieve from memory a cache line's worth of instructions or data for storing in the relevant cache, and as part of this linefill operation, the contents of an existing cache line within the cache will typically be evicted. To determine which cache line to evict, a replacement scheme will typically be employed in order to identify a victim cache line to be evicted.

As another example of a storage unit, a translation lookaside buffer (TLB) may be provided for reference by the processing circuitry when performing instruction fetch or data access operations. For example, if the load/store unit of the processing circuitry needs to access data at a specified address, it will typically reference a data TLB in order to obtain data access control information associated with that address. This access control information will be retrieved from a page table in memory, the page table containing descriptors for particular memory regions. Each descriptor contains a variety of access control information, for example access permission rights identifying whether an address in the associated memory region can be accessed by the processing circuitry in its current mode of operation, region attributes specifying for example whether the address being accessed is cacheable, bufferable, etc. Further, if virtual addresses are issued by the processing circuitry, such access control information may specify a virtual to physical address translation.

Similarly, when the fetch unit of the processing circuitry is seeking to fetch an instruction from a specified address, it may look in an instruction TLB in order to determine instruction access control information pertaining to that address, again that access control information being obtained from descriptors in memory.

For both of the above types of TLB, if a lookup in the TLB does not produce a hit, i.e. the TLB does not contain access control information for the specified address, then the access control information will be obtained from the relevant descriptor in the appropriate page table held in memory, and that access control information will be written into the TLB. As part of this process, a victim entry in the TLB will need to be identified which will have the information stored therein overwritten by the new access control information retrieved from memory, and again a replacement scheme will typically be employed to identify the victim entry.

As yet a further example of a storage unit, a branch target buffer (BTB) may be provided for access by the fetch unit of the processing circuitry when determining a next instruction to fetch from memory. In particular, if it is determined that a currently fetched instruction is a branch instruction, and that branch instruction is predicted to be taken, then the fetch unit may access the BTB in order to seek to determine the target address for that branch, so as to determine the next instruction to fetch. If the target address is not stored in the BTB for the branch instruction in question, then when the branch instruction is subsequently executed and the target address is hence determined, a victim entry in the BTB may be identified and that target address information is then stored in the victim entry of the BTB (overwriting the previous content of that victim entry). Again, a replacement scheme will typically be employed to identify the victim entry.

The various storage units provided in the data processing apparatus for reference by the processing circuitry when executing sequences of instructions may be fully associative (as an example, some TLB structures are fully associative, for example a micro-TLB is typically fully associative), and other storage units may be set associative (for example, a cache or BTB will typically be set associative). Irrespective of whether the storage unit is fully associative or set associative, a mechanism needs to be provided for selecting a victim entry whose information stored therein is to be replaced following the occurrence of a predetermined event, for example a cache miss in a cache, a TLB miss in a TLB, a BTB miss in a BTB, etc. A number of schemes exist for selecting victim entries in such situations. For example, one simple scheme is to employ a random replacement algorithm which selects an entry of the storage unit at random to be the victim entry. An alternative mechanism is to use a round-robin scheme which steps through the entries in turn when selecting victim entries.

Whilst such schemes can give satisfactory results, alternative, more complex, replacement policies have been developed which seek to make a more considered decision as to the choice of victim entry. For example, one known scheme is the "least recently used" (LRU) replacement policy scheme, which keeps a record of the usage of individual entries, and then when it is required to choose a victim entry, chooses the entry that has been least recently used by the processing circuitry. Whilst such an LRU replacement policy may provide better performance than a round-robin or random replacement policy for set or fully associative storage units, it is significantly more costly to implement.

If the processing circuitry executes multiple program threads, then additional issues arise. The multiple program threads may comprise separate applications, or may instead comprise different processes within an individual application that are allowed to execute in parallel. For example, in a chip multi-processor (CMP) system, multiple processor cores may each execute a different program thread, and the various processor cores may share access to one or more storage units, for example a level two cache. As another example, in a multi-threaded processor such as a simultaneous multi-threaded (SMT) processor, a single processor core may be arranged to execute multiple program threads, and there may be various storage units shared between the multiple program threads, for example a TLB, a BTB, one or more caches, etc.

Whilst a particular program thread is executing, it may be necessary to select a victim entry to be evicted from a particular shared storage unit, and according to the replacement scheme used, this may cause an entry belonging to a different thread to be evicted. For example, if the replacement policy is an LRU policy, then the least recently used entry, no matter which thread it belongs to, will be chosen as the victim entry. Similarly, if the policy is random, then the entry identified by a pseudo-random number generator will be chosen as the victim entry, and again this is irrespective of which thread that entry belongs to.

Often, processing circuitry that executes multiple program threads does not prioritise amongst the threads, and in such environments the above types of replacement policy may be acceptable. However, it is becoming more commonplace for one or more of the program threads to be considered to be of a higher priority than other program threads. As an example, this will typically be the case in a real-time system where a high priority, real-time, thread will be given preferential access to various resources, whilst other lower priority program threads are opportunistic in the sense that they are allowed access to the resources only when the high priority thread stalls for some reason. As an example, in a car, processing circuitry may be provided to control a variety of processes through execution of multiple program threads, and a program thread associated with the management of an ABS braking system may be considered to be a real-time, high priority, program thread.

In such multi-threaded systems, if a lower priority program thread can cause the information stored in an entry belonging to a high priority program thread to be evicted, this can be detrimental to the performance of the high priority program thread.

Accordingly, it would be desirable to provide an alternative replacement scheme for entries of a storage unit shared between multiple program threads including at least one high priority program thread and at least one lower priority program thread.

SUMMARY OF THE INVENTION

Viewed from a first aspect, the present invention provides a data processing apparatus comprising: processing circuitry for executing multiple program threads including at least one high priority program thread and at least one lower priority program thread; a storage unit shared between the multiple program threads and comprising multiple entries for storing information for reference by the processing circuitry when executing said program threads; a record identifying for each entry whether the information stored in that entry is associated with said at least one high priority program thread or with said at least one lower priority program thread; and replacement circuitry, responsive to a predetermined event, to select a victim entry whose stored information is to be replaced, the replacement circuitry performing a candidate generation operation to identify a plurality of randomly selected candidate entries from said multiple entries, and referencing said record in order to preferentially select as the victim entry one of said candidate entries whose stored information is associated with said at least one lower priority program thread.

In accordance with the present invention, a record is maintained identifying for each entry of the storage unit whether the information stored therein is associated with a high priority program thread or a lower priority program thread. In one embodiment, only one program thread is designated as a high priority program thread, whilst in an alternative embodiment more than one program thread may be specified as a high priority program thread. Similarly, there may be one lower priority program thread, or alternatively there may be more than one lower priority program thread. In embodiments where there is more than one lower priority program thread, those lower priority program threads may all have the same priority, or alternatively may have different relative priorities allocated to them. However, in one embodiment of the present invention, such relative priorities between lower priority program threads is not relevant to the information maintained in the record, and instead the record merely identifies on an entry-by-entry basis whether the information stored in that entry is associated with the at least one high priority program thread, or with some other (non-high priority) program thread.

Responsive to a predetermined event (typically a miss condition being detected upon performing a lookup in the storage unit), the replacement circuitry then selects a victim entry by identifying a plurality of randomly selected candidate entries and then referencing the record in order to preferentially select as the victim entry a candidate entry whose stored information is associated with a lower priority (i.e. non-high priority) program thread.

Accordingly, the present invention adopts a priority-driven random replacement policy, such that the probability of replacing an entry belonging to a lower priority program thread is higher than the probability of replacing an entry belonging to a high priority program thread. By producing a plurality of candidate entries for eviction rather than generating a single victim entry directly, this improves the likelihood that one of the plurality of candidate entries will store information associated with a lower priority program thread, and then by preferentially selecting as the victim entry a candidate entry associated with a lower priority program thread, this increases the likelihood that entries associated with lower priority program threads will be evicted.

The number of randomly selected candidate entries produced during the candidate generation operation can be varied as a design parameter. By increasing the number of randomly selected candidate entries produced, this increases the likelihood that one of those entries will be associated with a lower priority program thread, but that needs to be balanced against the additional circuitry required to produce each additional candidate entry.

There are a number of ways in which the replacement circuitry can preferentially select as the victim entry a candidate entry whose stored information is associated with a lower priority program thread. For example, the replacement circuitry may maintain a history of previous victim entries and the priority of the program threads associated with those victim entries, and aim over time to achieve a certain ratio between victim entries associated with lower priority program threads and victim entries associated with the high priority program thread(s). Hence, purely by way of example, the replacement circuitry may aim for 80% of the victim entries over a certain period of time to be associated with a lower priority program thread.

However, in one embodiment no such history information is maintained, and instead each time the replacement circuitry operates to select a victim entry, it aims where possible to select as the victim entry a candidate entry whose stored information is associated with a lower priority program thread. In particular, in one embodiment, if at least one of said plurality of candidate entries is associated with said at least one lower priority program thread, the replacement circuitry selects as the victim entry one of said candidate entries associated with said at least one lower priority program thread; and only if all candidate entries are associated with said at least one high priority program thread, the replacement circuitry selects as the victim entry one of said candidate entries associated with said at least one high priority program thread.

The record may be constructed in a variety of ways. In one embodiment, the record maintains a field for each entry of said storage unit, each field being set to identify that the associated entry stores information associated with said at least one high priority program thread and being cleared to identify that the associated entry stores information associated with said at least one lower priority program thread.

There are a number of ways in which the fields of the record may be updated. However, in one embodiment, when information is written into an entry of the storage unit, the associated field in the record is set or cleared dependent on whether that entry is being written to as a result of execution of the at least one high priority program thread or the at least one lower priority program thread. Hence, each time an entry of a storage unit is populated with information, the associated field in the record is updated accordingly.

Each field may be a multi-bit field, so as for example to allow multiple levels of priority to be encoded therein. However, in one embodiment, each field is a single bit field, and merely identifies whether the associated entry stores information of a high priority program thread, or information of any other program thread.

The record may take a variety of forms, but in one embodiment the record is formed as a register, where each bit of the value stored in the register is associated with a different entry of the storage unit.

In one embodiment, the storage unit has a fully associative structure and hence any item of information can be stored in any entry of the storage unit. However, in an alternative embodiment, the storage unit has a set associative structure and the record comprises a sub-record for each set of the storage unit, the replacement circuitry being responsive to said predetermined event to select the victim entry from a specified set, and to reference the sub-record associated with that specified set when selecting the victim entry. In accordance with such a set associative structure, an attribute associated with an item of information (for example an address of an instruction or data to be accessed in a cache) will typically dictate which set of the storage unit that item of information has to be stored in, and accordingly the victim entry needs to be selected from that set. The plurality of randomly selected candidate entries will then be chosen from the multiple entries of the relevant set, and by referencing the sub-record associated with the relevant set, the replacement circuitry can then preferentially select as the victim entry a candidate entry within the relevant set that stores information associated with a lower priority program thread.

The replacement circuitry can take a variety of forms. However, in one embodiment, the replacement circuitry comprises: index generation circuitry for generating a plurality of indices, each index identifying one of said candidate entries; and selection circuitry for receiving as inputs said plurality of indices and for outputting one of said indices as an identifier for the victim entry; the record being referenced based on said plurality of indices in order to control the selection circuitry. Hence, the generated plurality of indices are used as inputs to the selection circuitry and are also used to reference the record in order to produce appropriate control signals for the selection circuitry to enable it to output one of those received indices as an identifier for the victim entry.

In one embodiment, the data processing apparatus further comprises: random number generator circuitry for generating at least one true random or pseudo random number; said index generation circuitry comprising a plurality of index generation units, each index generation unit receiving a true random or pseudo random number input from the random number generator circuitry and generating an index therefrom. Each true random or pseudo random number input may itself be a separate true random or pseudo random number generated independently by the random number generator circuitry, or alternatively each index generation unit may receive as its true random or pseudo random number input a particular portion of a true random or pseudo random number generated by the random number generator circuitry, each index generation unit receiving a different portion of that true random or pseudo random number to the portions received by the other index generation units. The random number generator circuitry may comprise one, or more than one, generator of true random or pseudo random numbers.

The storage unit may take a variety of forms. For example, the storage unit may be a cache for storing data for access by the processing circuitry when executing the program threads, or alternatively may be a cache for storing instructions required for the program threads. Indeed, in an alternative embodiment, the storage unit may be a unified cache for storing both data and instructions.

As another example, the storage unit may be a translation lookaside buffer (TLB), for example an instruction TLB for storing instruction access control information or a data TLB for storing data access control information.

As yet another example, the storage unit may comprise a branch target buffer (BTB) for storing target addresses of branch instructions.

The processing circuitry can take a variety of forms. In one embodiment, the processing circuitry comprises a single processing unit executing multiple program threads. However, in an alternative embodiment, the processing circuitry comprises a plurality of separate processing units, each processing unit executing at least one program thread. Hence, each processing unit may execute a single program thread, or alternatively one or more of the separate processing units may itself execute more than one program thread, with the various threads then executing on the separate processing units being designated as either a high priority program thread, or a lower priority program thread.

The predetermined event causing the replacement circuitry to select a victim entry can take a variety of forms. However, in one embodiment, the processing circuitry causes a lookup operation to be performed in said storage unit when seeking to access specified information, and said predetermined event is a determination that the specified information is not stored in the storage unit. Hence, a miss condition detected when performing the lookup operation causes the replacement circuitry to select a victim entry.

Viewed from a second aspect, the present invention provides a method of operating a data processing apparatus to select a victim entry of a storage unit whose stored information is to be replaced, the data processing apparatus comprising processing circuitry for executing multiple program threads including at least one high priority program thread and at least one lower priority program thread, the storage unit being shared between the multiple program threads and comprising multiple entries for storing information for reference by the processing circuitry when executing said program threads, the method comprising the steps of: maintaining a record identifying for each entry whether the information stored in that entry is associated with said at least one high priority program thread or with said at least one lower priority program thread; and responsive to a predetermined event, selecting a victim entry whose stored information is to be replaced by: (i) performing a candidate generation operation to identify a plurality of randomly selected candidate entries from said multiple entries; and (ii) referencing said record in order to preferentially select as the victim entry one of said candidate entries whose stored information is associated with said at least one lower priority program thread.

Viewed from a third aspect, the present invention provides a data processing apparatus comprising: processing means for executing multiple program threads including at least one high priority program thread and at least one lower priority program thread; a storage means shared between the multiple program threads and comprising multiple entry means for storing information for reference by the processing means when executing said program threads; a record means for identifying for each entry means whether the information stored in that entry means is associated with said at least one high priority program thread or with said at least one lower priority program thread; and replacement means, responsive to a predetermined event, for selecting a victim entry means whose stored information is to be replaced, the replacement means for performing a candidate generation operation to identify a plurality of randomly selected candidate entry means from said multiple entries, and for referencing said record means in order to preferentially select as the victim entry means one of said candidate entry means whose stored information is associated with said at least one lower priority program thread.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
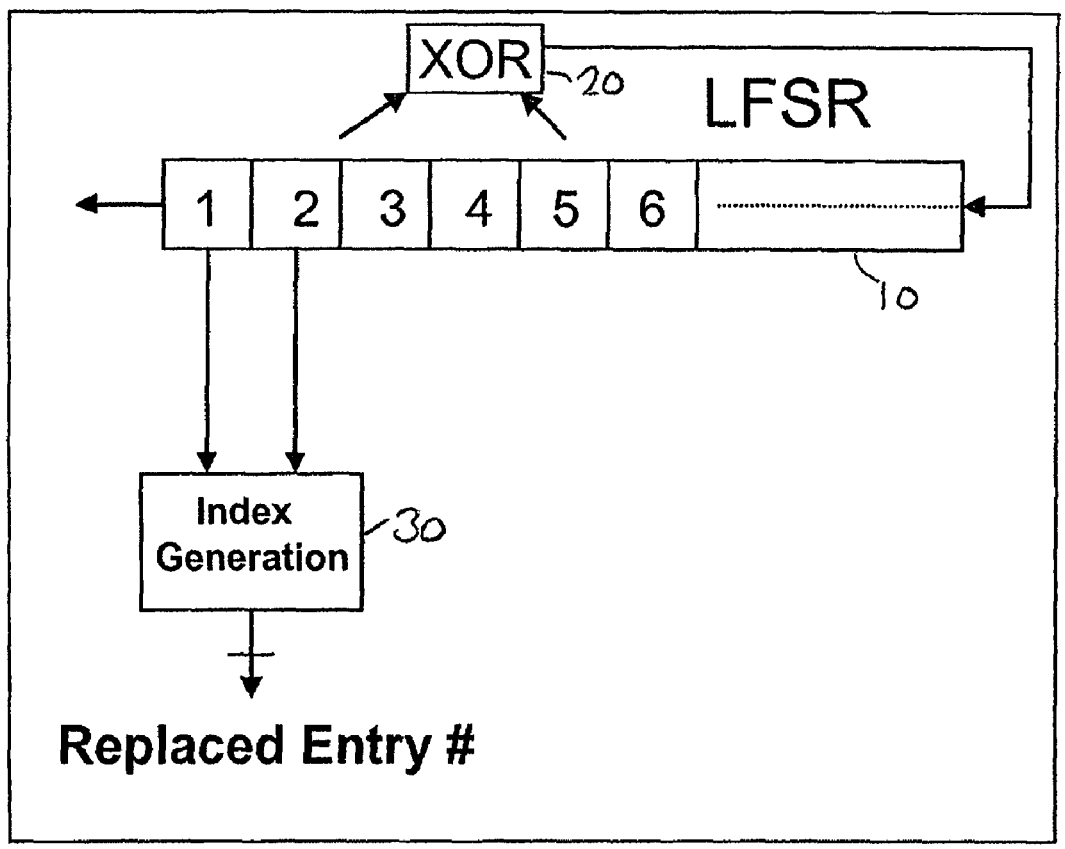
FIG. 1 illustrates a known random replacement scheme for selecting a victim entry of a storage unit.

The current known random replacement algorithms, whether used in set-associative or fully associative caches, TLBs, BTBs, etc., select an entry to be replaced randomly. The probability of an entry being replaced is equal for all entries, i.e. 1/N for an N-entry table. FIG. 1 illustrates a typical random replacement implementation using a linear feedback shift register (LFSR) 10. Initially, a random number is written into the LFSR 10, and then on every clock cycle the data in the LFSR 10 is shifted left by an input derived by XORing some of the bits in the register using the XOR function 20. When required, index generation circuitry 30 then generates an index identifying an entry of a storage unit to be used as a victim entry based on a certain number of most significant bits read by the index generation circuitry 30 from the LFSR 10. For example, if such a scheme is used in association with a fully associative table having sixteen entries, four most significant bits are read from the LFSR 10 by the index generation circuitry 30 in order to generate an index identifying the victim entry.

The LFSR scheme illustrated in FIG. 1 is just one known technique for implementing a pseudo-random generator, and it will be appreciated that alternative techniques can also be used in order to implement a random replacement scheme.

The type of random replacement scheme illustrated in FIG. 1 produces acceptable results when used in a multi-threaded data processing apparatus such as an SMT processor or a CMP processing system, in situations where all program threads have equal priority. However, such a scheme does not work efficiently when used in a data processing apparatus in which at least one of the program threads is considered to be a high priority program thread having a higher priority than the other program threads executing in the system, as for example is typically the case in a real-time system where at least one real-time program thread is a high priority program thread. In particular, such a scheme does not work efficiently in such situations, because each entry in the table has an equal probability of being replaced, and accordingly an eviction process performed whilst executing a low priority program thread may potentially cause an entry of the table associated with the high priority program thread to be evicted, thereby potentially adversely impacting the performance of the high priority program thread.

As will be discussed in more detail below, in accordance with embodiments of the present invention, a priority-driven random replacement mechanism is employed which increases the probability of selecting as the victim entry an entry associated with a low priority program thread, thereby speeding up the performance of the high priority program thread through the tendency to retain within the storage unit entries pertaining to the high priority program thread. In particular, in accordance with such schemes the probability of selecting a low priority program thread entry as the victim entry is higher than 1/N for an N-entry table, and in particular with such a priority driven random replacement scheme, the probability can be made as high as m/N, where m is a design parameter.

Figure 2:
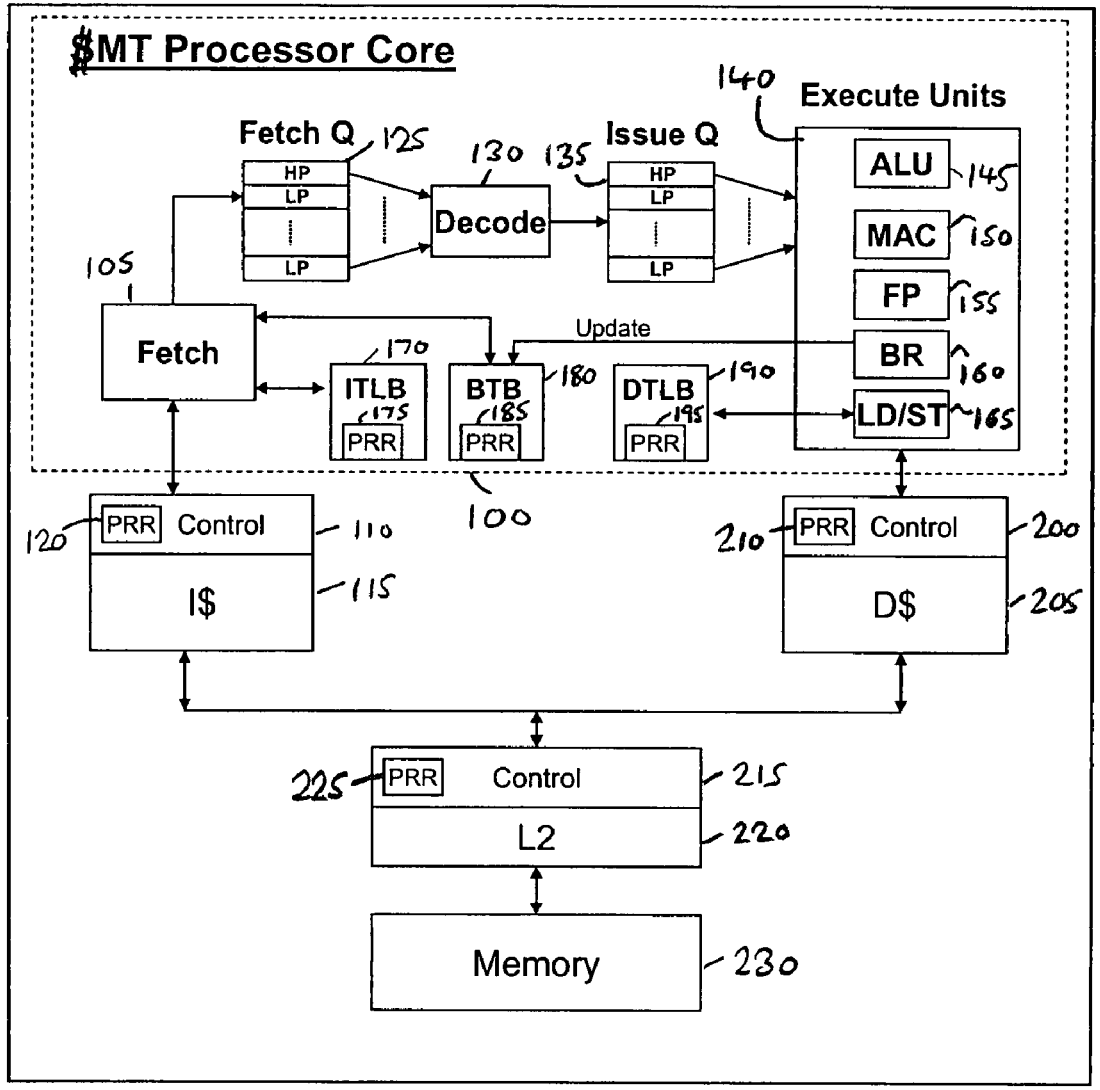
FIG. 2 is a block diagram illustrating a data processing apparatus in accordance with one embodiment of the present invention.

FIG. 2 illustrates a data processing apparatus in accordance with one embodiment of the present invention. In accordance with this embodiment, a multi-threaded (MT) processor core 100 (such as a coarse grained MT processor, fine grained MT processor, or simultaneous multi-threaded (SMT) processor) is used to execute multiple program threads. For the purposes of the following discussion, it will be assumed that the processor core 100 is an SMT processor core. In the example of FIG. 2, one of the program threads is considered to be a high priority program thread, and the remaining program threads are considered to be low priority program threads. A fetch unit 105 is used to fetch instructions from memory for the various program threads and place those instructions within the fetch queue 125, which can be considered to comprise separate queues for each program thread. Each of the instructions is decoded by the decoder 130 to produce operation control information specifying the required data processing operation to be performed, with that operation control information then being placed within the issue queue 135. The issue queue can be considered to have separate queues for each thread.

Each program thread shares the resources of the MT core. In one embodiment, if the higher priority thread has operations to be performed, they take preference over any operations to be performed in respect of the low priority program threads, and accordingly if the issue queue 135 contains operation control information relating to a high priority program thread, then that will be routed to the relevant one of the execute units 140 in preference to operation control information of a low priority program thread. However, in the absence of any operations needed in respect of the high priority thread, then operations associated with one or more of the low priority threads will be routed to the relevant one or more of the execute units 140.

As shown in FIG. 2, a number of execute units 140 will typically be provided within the SMT core. For example, an arithmetic logic unit (ALU) 145 will be used to perform arithmetic operations, and a multiply accumulate (MAC) unit will be used to perform multiply accumulate operations. A floating point (FP) unit 155 will be used to perform floating point operations, a branch unit 160 will be used to perform branch operations, and a load/store unit 165 will be used to perform load or store operations in order to load data from memory into working registers of the MT core, or to store data from such registers back to memory.

When the fetch unit 105 wishes to fetch an instruction, it will typically output the address of that instruction to the cache control unit 110 of an instruction cache 115, which will then perform a lookup operation within the instruction cache 115 in order to determine whether the instruction requested is currently stored within the cache. If it is, then the instruction will be returned to the fetch unit 105, whereas otherwise a linefill operation will be invoked, whereby the cache control logic 110 selects a victim cache line to be evicted from the cache, and issues a linefill request to the cache control logic 215 of the level two cache 220 in order to obtain a cache line's worth of instructions, including the instruction requested by the fetch unit. If the level two cache 220 has the required instructions, it will return them to the instruction cache 115, whereas if it does not a similar linefill operation will be invoked in order to cause a level two cache line to be evicted and a level two cache line's worth of instructions to be retrieved from memory 230 for storing in the level two cache, whereafter a level one cache line's worth of instructions will be returned to the instruction cache 115.

Similarly, if the load/store unit 165 wishes to access data, it will typically issue an access request for that data to the cache controller 200 of a data cache 205, and on receipt of that access request the cache controller 200 will determine whether the data being requested is present in the data cache. If so, the data will be accessed in the cache, whereas otherwise a linefill operation will be performed during which the cache controller 200 will select a victim cache line for eviction, and will issue a linefill request to the level two cache 220 and associated cache controller 215 in order to obtain a cache line's worth of data including the data the subject of the access request from the load/store unit 165. The level two cache 220 and associated cache controller 215 then operate in the same manner as discussed earlier with reference to the instruction fetch process.

Whilst in FIG. 2 it is assumed that at the level one cache level a separate instruction cache 115 and separate data cache 205 are provided, it will be appreciated that there is no requirement for separate instruction and data caches at the level one level, and instead a unified level one cache could be used. Similarly, whilst the level two cache 220 is shown as a unified cache, there is no requirement for the level two cache to be a unified cache, and accordingly a level two cache could alternatively take the form of a separate instruction cache and a separate data cache.

In accordance with embodiments of the present invention, a priority-driven random replacement mechanism may be employed in one or more of the caches of the system in order to select victim cache lines for eviction. In one particular embodiment, the priority-driven random replacement (PRR) mechanism is used in all of the caches illustrated in FIG. 2, and accordingly a PRR mechanism 120 is provided within the cache controller 110, a PRR mechanism 210 is provided within the cache controller 200, and a PRR mechanism 225 is provided within the cache controller 215 with the aim of preferentially selecting as victim cache lines cache lines whose content is associated with a low priority program thread.

However, the use of such a priority-driven random replacement mechanism is not limited to use in association with caches, and instead can be used in association with any fully associative or set-associative storage unit within the data processing apparatus. For example, an instruction TLB 170 will typically be provided in association with the fetch unit 105, and prior to issuing the fetch request for an instruction, the fetch unit 105 will reference the instruction TLB 170 in order to obtain access control information for a memory region including the address of the instruction to be fetched. This access control information is typically retrieved by the instruction TLB from a page table in memory, and in particular such page tables typically include descriptors for a number of different memory regions. If the fetch unit 105 specifies an address which does not match any of the entries currently stored in the TLB 170, then typically the relevant page table in memory will be accessed in order to retrieve the required descriptor and then store within an entry of the TLB the relevant access control information. As part of this process, a victim entry in the TLB 170 needs to be selected, and the priority-driven random replacement mechanism of embodiments of the present invention can be used to select that victim entry. Hence, the instruction TLB 170 can include the PRR mechanism 175 to select victim entries as and when required.

A data TLB 190 can be used in an identical manner to provide access control information in association with each access request to be issued by the load/store unit 165, and again a PRR mechanism 195 can be provided in association with the data TLB 190 in order to select victim entries as and when required.

As will be appreciated by those skilled in the art, the access control information stored in either the instruction TLB 170 or the data TLB 190 can take a variety of forms. For example, if virtual addressing is used within the MT core 100, a virtual to physical address translation can be specified as part of the access control information. Further, the access control information can include access permission rights identifying whether the specified address can be accessed by the MT core operating in its current mode of operation. For example, certain regions of memory may not be accessible by the MT core when operating in a user mode of operation. Additionally, the access control information may specify region attributes, for example specifying whether the address in question is cacheable, bufferable, etc. Only if the address is identified as being cacheable will lookup operations be performed in the relevant caches 115, 205, 220, and if the address is specified as non-cacheable, the required instruction or data value will be accessed directly in memory 230.

The fetch unit 105 will often use branch prediction circuitry for identifying branch instructions and predicting whether those branch instructions will be taken. For a branch instruction that is predicted to be taken, the fetch unit then needs to determine the next instruction to be fetched, and in one embodiment a branch target buffer (BTB) 180 is referenced by the fetch unit 105 in order to seek to identify the target address for the branch instruction, and hence identify the next instruction to be fetched. If on accessing the BTB 180, it is determined that none of the entries in the BTB 180 provide a target address for the branch instruction in question, then the fetch unit 105 will not at that time be able to determine the target address, and accordingly will have to take some different action, for example by stopping the fetch process, fetching from sequential addresses, etc. However, when the branch instruction is subsequently executed, the branch unit 160 will determine the target address, and can provide that information to the BTB 180 for storing in the BTB. In particular the BTB will select a victim entry to become an allocated entry for that branch target information, an indication of the branch instruction and the associated target address then being stored in that victim entry. In accordance with one embodiment of the present invention, the BTB 180 can be provided with a PRR mechanism 185 in order to determine a victim entry to become the new allocated entry which will store an identifier for the branch instruction, and the associated branch target address calculated by the branch unit 160.

Figure 3:
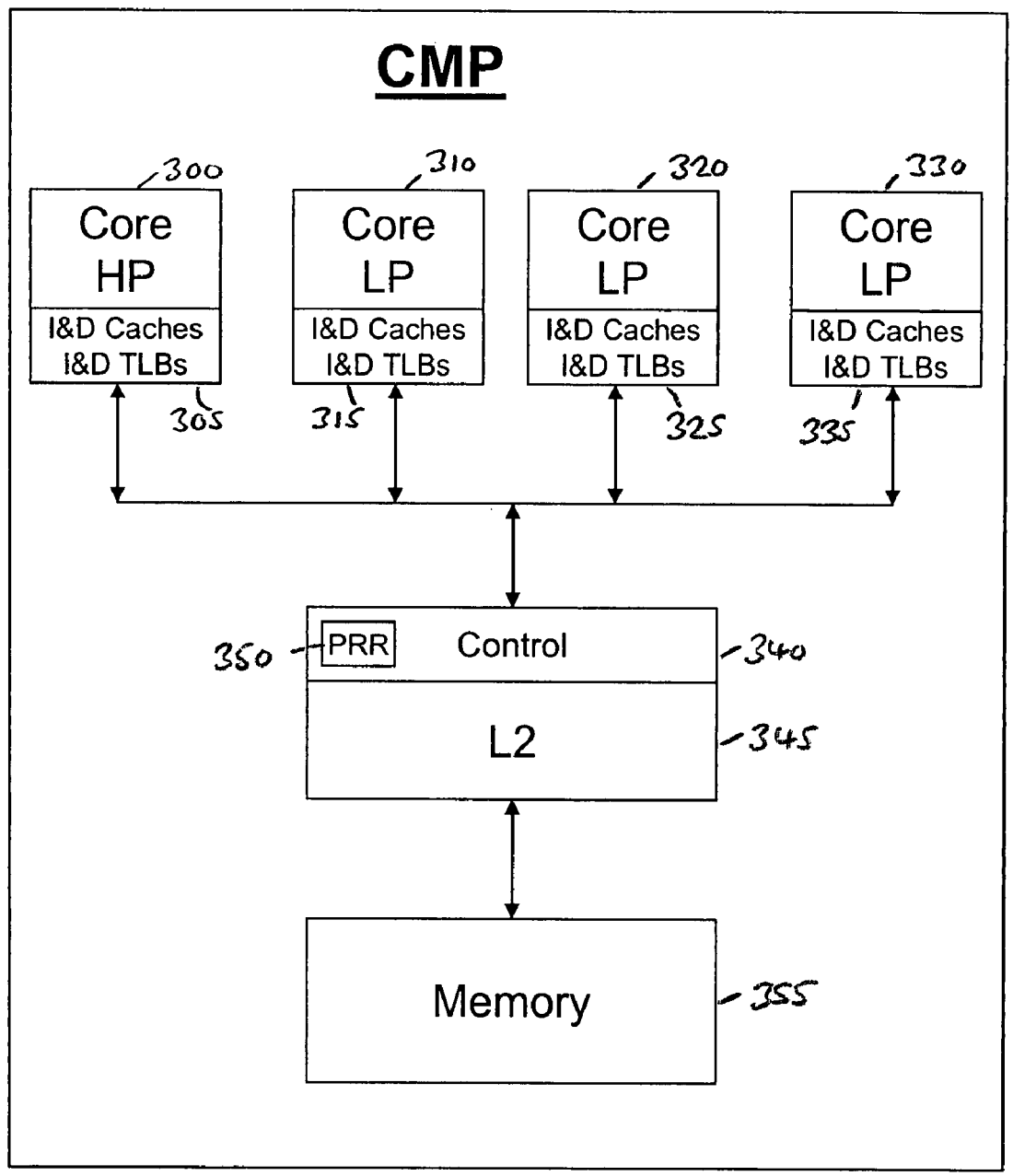
FIG. 3 is a block diagram illustrating a data processing apparatus in accordance with an alternative embodiment of the present invention.

Embodiments of the present invention are not limited to a data processing apparatus having a MT processor core 100. For example, FIG. 3 illustrates an alternative embodiment where a CMP system has multiple processor cores 300, 310, 320, 330, each of which may have their own associated level one instruction and data caches and instruction and data TLBs 305, 315, 325, 335, respectively. Each core may also have its own BTB. In accordance with the embodiment illustrated in FIG. 3, each processor core executes a single program thread, with processor core 300 executing a high priority program thread, and the remaining processor cores 310, 320, 330 each executing a low priority program thread. Accordingly, it can be seen that the local level one instruction and data caches, TLBs, BTBs, etc. are not shared between the program threads and accordingly the priority-driven random replacement mechanism of embodiments of the present invention is not employed in association with those structures. However, the level two cache 345 and associated cache controller 340 are shared amongst the program threads, and accordingly a PRR mechanism 350 can be provided in association with the cache controller 340 in order to select victim cache lines for eviction. The contents of the victim cache line can then be evicted to memory 355, and a new cache line's worth of data retrieved from memory 355 for storing in the level two cache 345.

In an alternative embodiment, one or more of the processor cores 300, 310, 320, 330 may execute multiple program threads. If any one core executes at least one high priority program thread and at least one low priority program thread, then the local instruction and data caches, instruction and data TLBs and any local BTB may be constructed as discussed earlier with reference to FIG. 2, and in particular may include the priority-driven random replacement mechanism of embodiments of the present invention.

Figure 4:
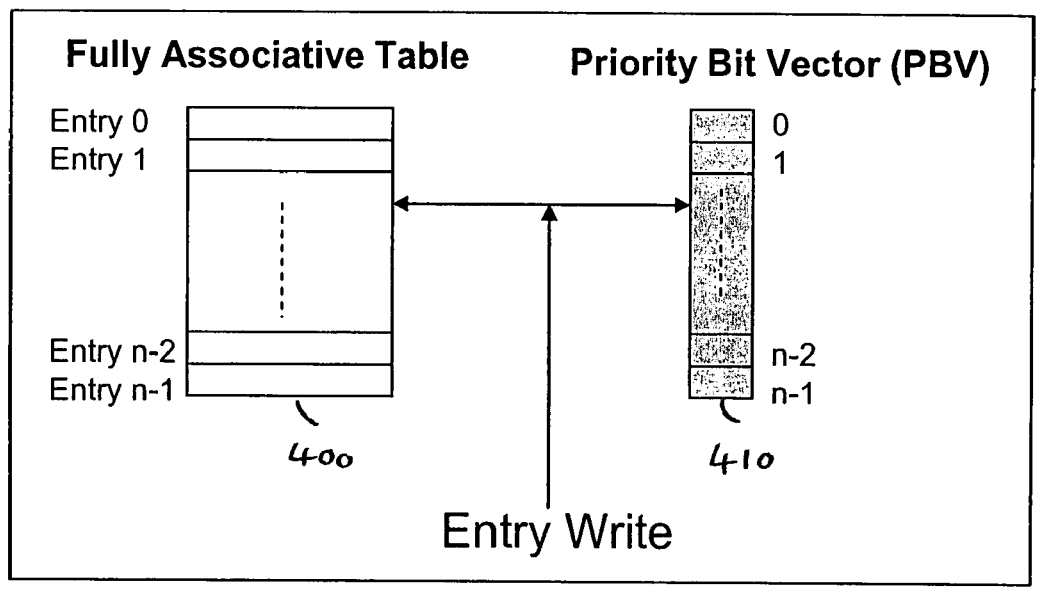
FIG. 4 illustrates the use of a priority bit vector in accordance with one embodiment of the present invention.

The priority-driven random replacement mechanism of embodiments of the present invention will now be described in more detail. Generally, this mechanism operates by randomly generating identifiers for a plurality of candidate entries, any one of which can be chosen as the victim entry. However, once the plurality of candidate entries has been identified, the mechanism then seeks to select as the victim entry a candidate entry associated with a low priority program thread. In order to support such a mechanism, a record needs to be maintained to identify the thread to which each entry in the table belongs. In one embodiment, such a record takes the form of a priority bit vector (PBV) as shown in FIG. 4. In particular, FIG. 4 shows a register 410 storing the PBV for a fully associative table 400 having n entries. Accordingly, the register 410 stores the PBV as an n-bit value, where each bit of the PBV is associated with a particular entry of the table 400. Whenever an entry in the table 400 is populated with information, an indication of the priority of the program thread causing that write operation in the table to take place is recorded within the relevant bit field of the PBV.

In particular, for each entry in the table, there is a priority bit in the PBV. Initially, the PBV register 410 has all bits set to zero. When an entry in the table 400 has information written into it by a high priority program thread, the associated bit in the PBV register 400 is set. However, if the entry is being written by any low priority program thread, the PBV bit is cleared. In one particular embodiment, a logic one value indicates a set priority bit, and a logic zero value indicates a cleared priority bit.

Figure 5:
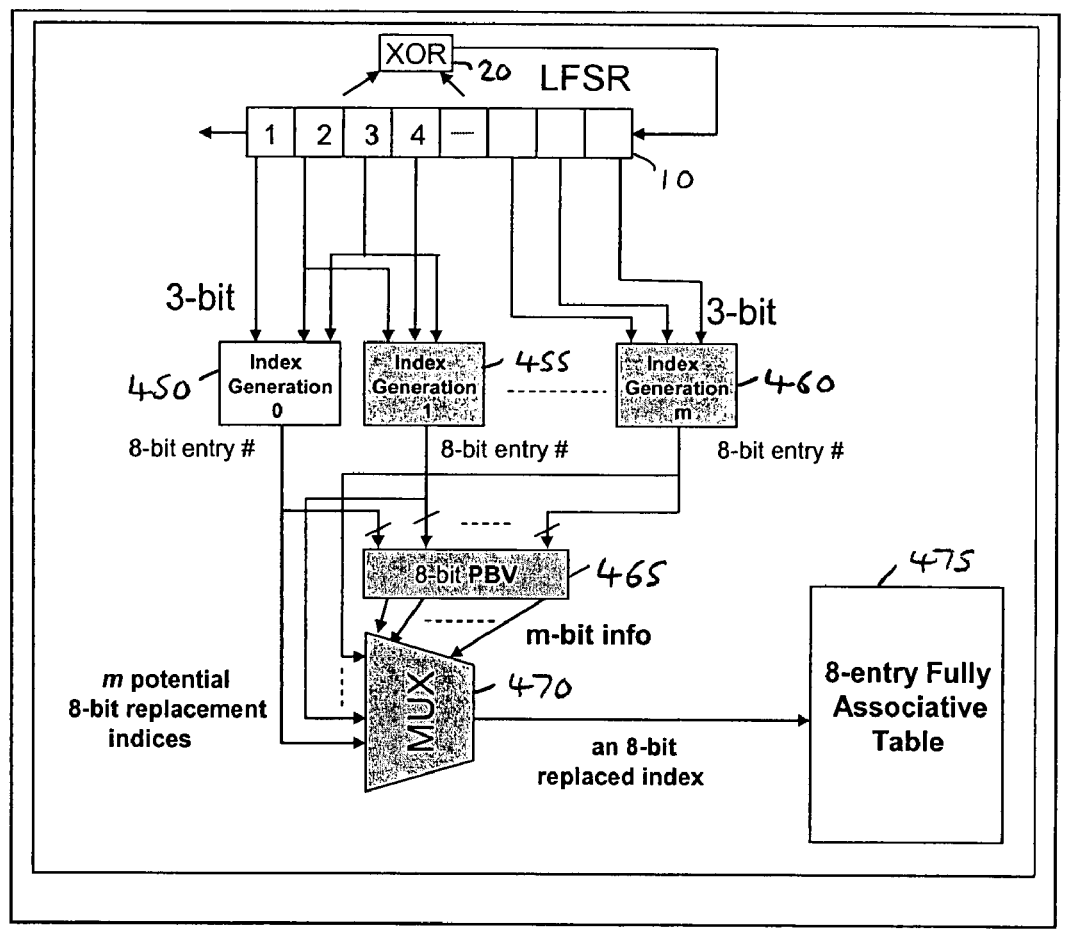
FIG. 5 is a block diagram schematically illustrating the priority-driven random replacement mechanism employed in one embodiment of the present invention for a fully associative table.

FIG. 5 illustrates the priority-driven random replacement circuitry used in one embodiment in association with a fully associative table. In this embodiment, random number generator circuitry is provided by a LFSR 10 and associated XOR function 20 which operates as described earlier with reference to FIG. 1. However, it will be appreciated that the techniques of embodiments of the present invention can be used in association with any kind of pseudo-random generator, and hence it is not required to use an LFSR mechanism.

In contrast to the FIG. 1 approach, in accordance with embodiments of the present invention, multiple index generation circuits 450, 455, 460 are provided, each of which receive a certain number of bits from the LFSR 10. In the particular example illustrated in FIG. 5, the fully associative table 475 is an eight-entry table, and accordingly three bits are sufficient to uniquely identify any of the eight entries. Accordingly, each index generation circuit 450, 455, 460 receives three bits from the LFSR 10, each index generation circuit receiving a different three bits to the three bits received by any of the other index generation circuits.

From these three-bit inputs, each index generation circuit then identifies an eight-bit value where one of the bits is set to a logic one value to identify a corresponding entry in the table 475, and all other bits are set to zero.

Since the table has eight entries, the associated PBV register 465 is eight-bits wide, and each output value from an index generation circuit 450, 455, 460 is used to reference the PBV register 465 in order to determine the value of the bit stored therein in association with the entry identified by that output value. Hence, by way of example, if index generation circuit 450 outputs an eight-bit entry number identifying entry five of the table 475, then a lookup is performed in the PBV register 465 to identify the value of the priority bit associated with entry five, and the value of that priority bit is then output to the multiplexer 470.

Assuming there are m index generation circuits, then m 8-bit indices will be received by the multiplexer 470 identifying m candidate entries. Similarly, m-bits of control information will be routed from the PBV register 465 to the multiplexer 470. These m 1-bit control signals from the PBV register 465 are then used by the multiplexer to select the first low-priority entry number generated by the index generation circuits 450, 455, 460, moving from left to right, with that selected entry number then identifying the victim entry. The identifier for that victim entry is then output to the table 475.

Hence, if index generation circuit 450 identifies a candidate entry which the PBV register 465 indicates is associated with a low priority program thread, then that candidate entry will be chosen as the victim entry. Alternatively, if the candidate entry identified by the index generation circuit 450 is associated with a high priority program thread, but the candidate entry identified by the index generation circuitry 455 is associated with a low priority program thread, then the candidate entry produced by the index generation circuitry 455 will be selected by the multiplexer as the victim entry. Only if none of the candidate entries produced by the various index generation circuits 450, 455, 460 are associated with a low priority program thread will the mechanism then select as a victim entry a candidate entry associated with a high priority program thread. In one embodiment, the first high priority entry starting from the left will be the victim entry under such conditions, and accordingly the victim entry will be the candidate entry generated by index generation circuit 450 under such conditions.

By providing m index generation circuits, this increases the probability of finding a candidate entry which is associated with a low priority program thread. The value of m is an implementation dependent parameter.

It should be noted that whilst such a mechanism preferentially evicts entries associated with low priority program threads, it is still possible that an entry associated with a high priority program will be evicted even if some of the entries of the table are associated with a low priority program thread. For instance, all m indices generated by the various index generation circuits 450, 455, 460 may identify entries that are associated with a high priority program thread, even though the table may have some entries belonging to a low priority program thread. However, if m is large enough, it is highly likely that a candidate entry associated with a low priority program thread will be identified, and accordingly can be selected as the victim entry.

The priority-driven random replacement mechanism of FIG. 5 can be used in association with any fully associative table. Considering FIG. 2, the instruction TLB 170 and data TLB 190 may be formed as micro TLBs that are fully associative, and accordingly the PRR mechanism 175 and 195 may take the form illustrated in FIG. 5. However, TLB mechanisms often employ a two tier approach, with the lookup first being performed in a fully associative micro TLB, and if a miss occurs in the micro TLB, a further lookup is then performed in a set associative main TLB. In addition, branch target buffers and caches often employ set associative structures.

Figure 6:
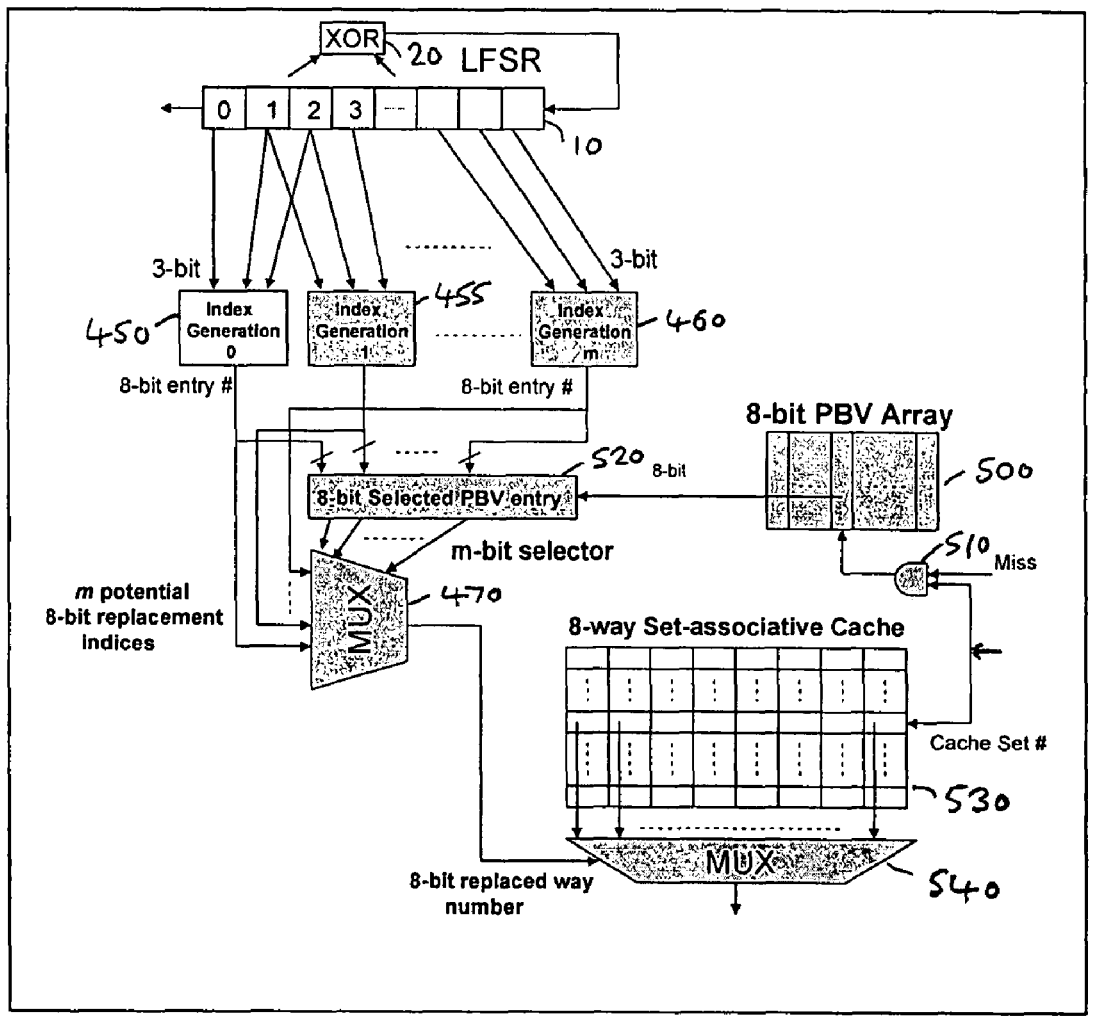
FIG. 6 is a block diagram schematically illustrating the priority-driven random replacement mechanism employed in one embodiment of the present invention for a set-associative cache.

FIG. 6 shows an alternative implementation of the priority-driven random replacement mechanism that can be used for such set associative structures.

Those elements of FIG. 6 which are identical to the corresponding elements in FIG. 5 are denoted by the same reference numerals. As can be seen, the main difference is that an array 500 of PBV registers are provided, each individual PBV register being associated with a different set of a set associative storage unit. In this example, the set-associative storage unit takes the form of an eight-way set associative cache 530, and accordingly each PBV register in the array 500 stores an eight-bit value, each bit being associated with a particular way of the cache.

When a fetch or access request is issued to the cache, a portion of the address specified in that request will identify the relevant set within the cache. If on a lookup in that set of the cache, no hit is detected, a linefill procedure will be invoked, and accordingly the priority driven random replacement mechanism will select a victim cache line. In this event, the set information will be routed via the qualifying AND gate 510 (qualified by the miss signal) to identify the relevant PBV register in the array 500 to form the eight-bit selected PBV entry 520. Thereafter, the selected PBV entry 520 operates in the same way as the PBV 465 of FIG. 5, and produces control data for the multiplexer 470 to enable it to select one of the candidate cache lines as the victim cache line, that victim cache line then being identified by an eight-bit way value identifying the particular way of the set whose cache line is to be evicted. This way number identifier is then used as a control input for the multiplexer 540 to cause the relevant cache line to be selected and output as the evicted cache line.

Figure 7:
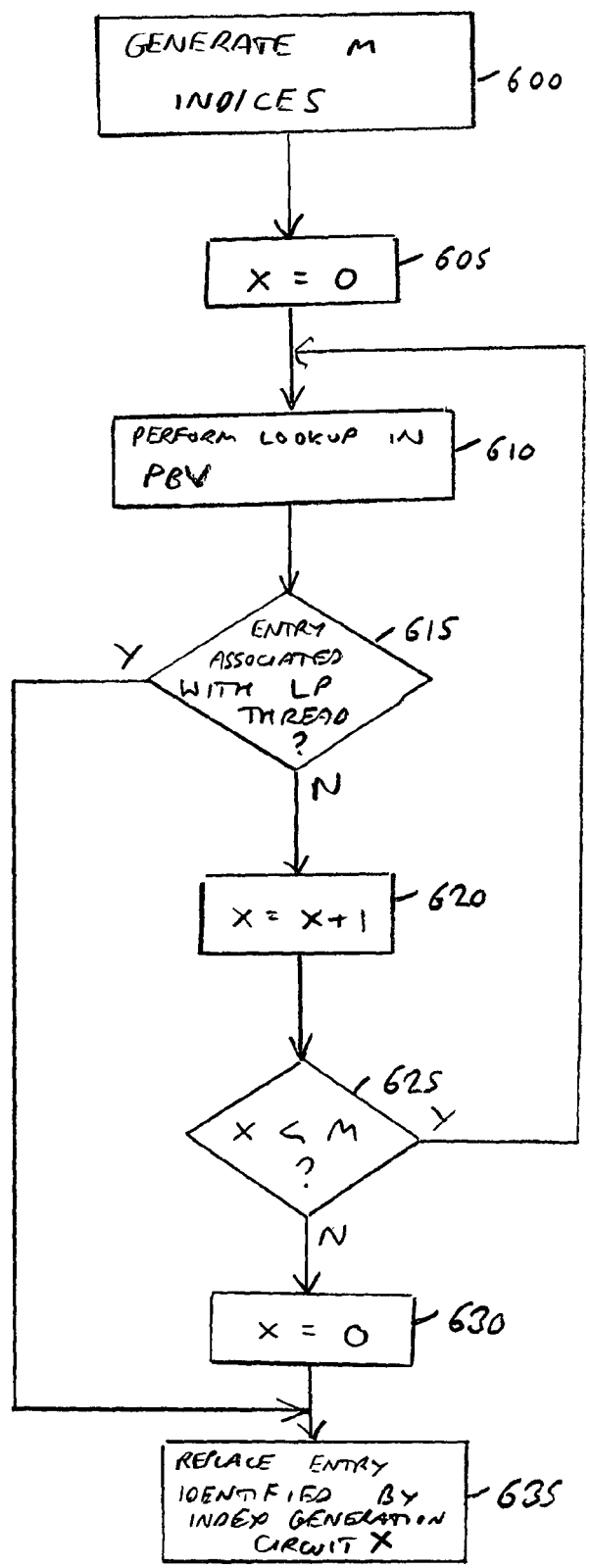
FIG. 7 is a flow diagram illustrating the operation of the priority-driven random replacement mechanism in accordance with one embodiment of the present invention.

FIG. 7 is a flow diagram schematically illustrating the operation of the priority-driven random replacement mechanism of embodiments of the present invention. At step 600, m indices are generated by the index generation circuits 450, 455, 460. Thereafter, a parameter X is set equal to zero, and then at step 610 a lookup is performed in the relevant PBV to determine the value of the priority bit for the candidate entry identified by index generation circuit X (on the first iteration this will be index generation circuit 450). Thereafter, it is determined whether the priority bit obtained from the lookup process of step 610 indicates that the candidate entry produced by index generation circuit X is associated with a low priority program thread. If it is, the process proceeds directly to step 635 where the entry identified by index generation circuit X is selected as the victim entry for replacement.

However, if at step 615 it is determined that the entry is not associated with a low priority program thread, then the process proceeds to step 620 where the parameter X is incremented, and then at step 625 it is determined whether X is less than the parameter m. If it is, the process returns to step 610 to perform a lookup in the PBV for the priority bit of the next candidate entry, whereafter step 615 is repeated in respect of that entry.

If at point 625 it is determined that the parameter X is not less than m, then this indicates that all candidate entries have been evaluated, and none of them are associated with a low priority program thread. Accordingly, the process proceeds to step 630, where X is again set equal to zero, whereafter at step 635 the entry identified by index generation circuit X (in this instance index generation circuit 450) is chosen as the victim entry, even though it is associated with a high priority program thread.

In the following paragraphs, some experimental results are discussed, which were obtained for a fully associative micro data TLB (DTLB) table in a 2-thread SMT core in which one thread has highest priority over the other one. Both threads share the same data DTLB. The baseline or original TLB uses a traditional random replacement policy. For the PRR mechanism of embodiments of the present invention the number of randomly generated indices is varied from 2 to 8.

Three metrics were measured to compare the performance of the PRR mechanism to the traditional random replacement scheme: 1) Speedup of the highest priority thread, 2) CPI of the lowest priority thread, and finally 3) the total IPC. As the highest priority (HP) thread has the priority to use all processor resources over the other thread, any optimization on a shared processor resource will shorten its execution time because there will be some improvement in the DTLB hit rate of the HP thread. Thus, measuring the speedup relative to the baseline is a sensible metric. By nature, the PRR scheme will reduce the DTLB hit rate of the low priority (LP) thread as the scheme is inclined to evict an LP entry from the DTLB. Therefore, a measure of how this decline in the DTLB hit rate in LP thread affects its overall performance would be appropriate. Thus, the CPI of the LP thread in the SMT core was measured for both baseline and the PRR scheme. Finally, the total IPC of the processor provides a measure of the total throughput of the processor with respect to the varying number of randomly-generated indices.

Figure 8:
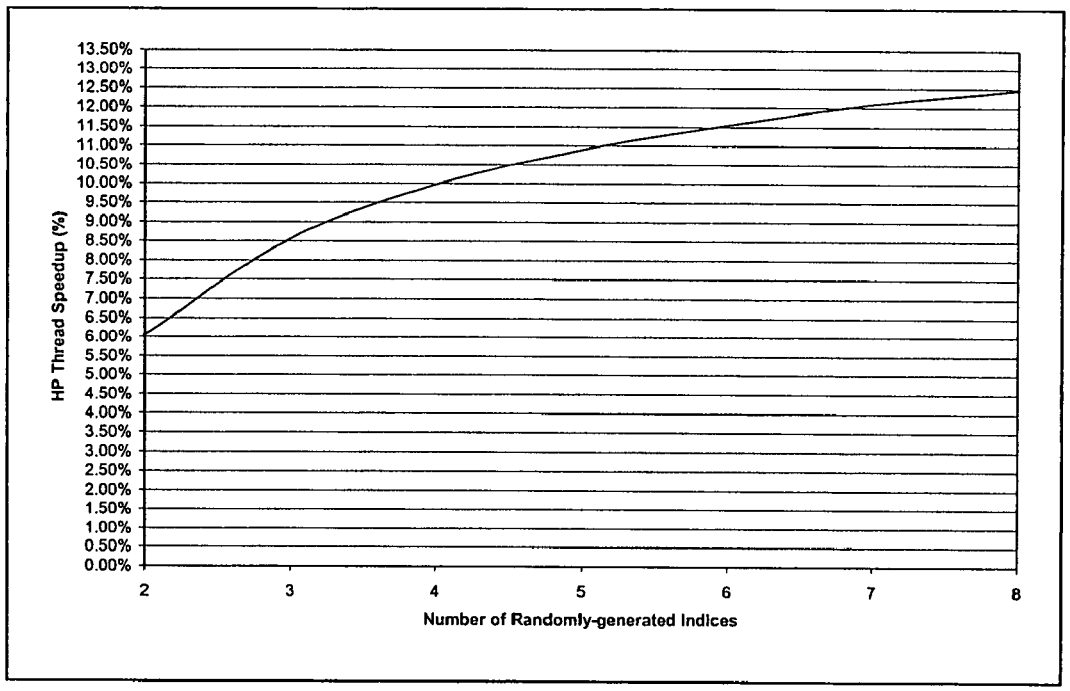
FIG. 8 is a chart illustrating the speedup of a high priority program thread executing on a processor when using the priority-driven random replacement scheme of one embodiment of the present invention for a fully associative micro data TLB.

All measurements were performed for an 8-entry fully-associative micro DTLB. FIG. 8 shows the speedup of the HP thread in a processor using the PRR scheme with varying numbers of randomly-generated indices relative to the same processor using the traditional random replacement scheme.

The randomly-generated indices vary from 2 to 8 to observe the behaviour of the HP thread performance. The slope of the curve ramps up to 3 indices and gradually declines thereafter. This means that generating 3 or more random indices still improves the performance of the HP thread but the rate of improvement slows down. The actual speedup values are 6.1%, 8.7%, 10%, 10.9%, 11.6%, 12.1% and 12.5% for 2, 3, 4, 5, 6, 7 and 8 indices, respectively.

Figure 9:
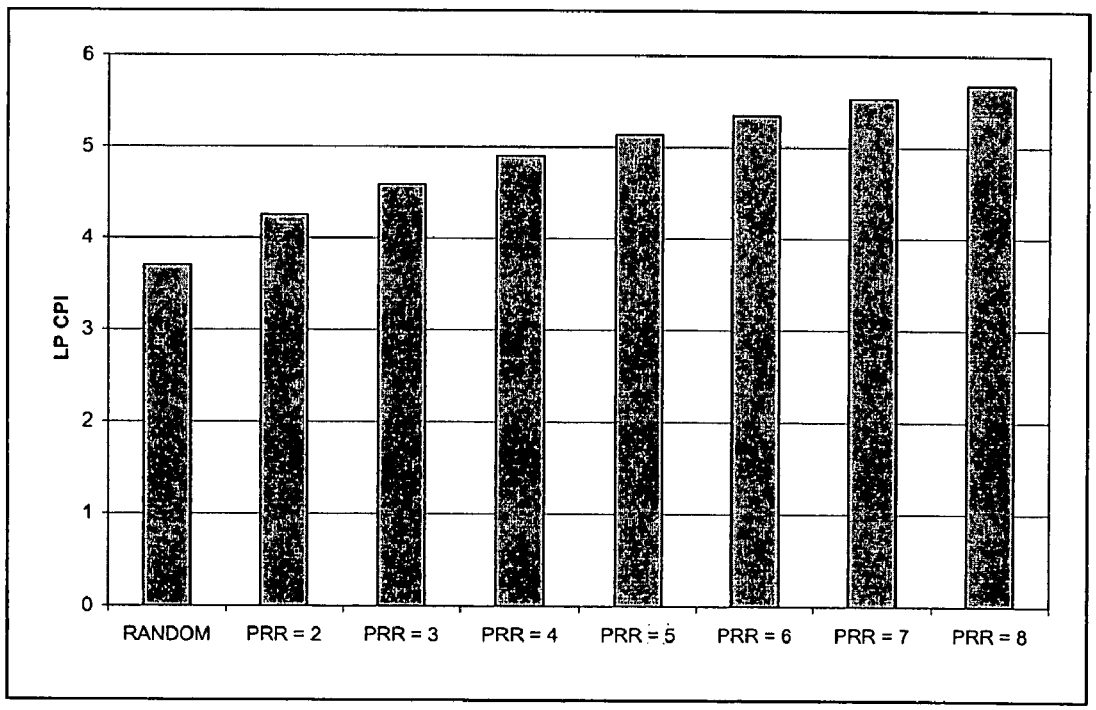
FIG. 9 is a chart illustrating the cycles per instruction (CPI) of a low priority program thread when using the priority-driven random replacement scheme of one embodiment of the present invention for a fully associative micro data TLB.

FIG. 9 shows the CPI of the LP thread for the traditional random replacement scheme as well as for the varying sizes of the PRR scheme. The CPI of the LP thread for the traditional random replacement scheme is about 4, which means that it can commit an instruction at every 4 cycles. In contrast, the LP thread when using the PRR scheme commits an instruction at every 5 cycles up to 4 indices. This is only 1 cycle worse than the traditional random replacement scheme due to decline in the DTLB hit rate of the LP thread. Thereafter, the CPI is increased by one more cycle and becomes 6 for 5 or more indices.

Figure 10:
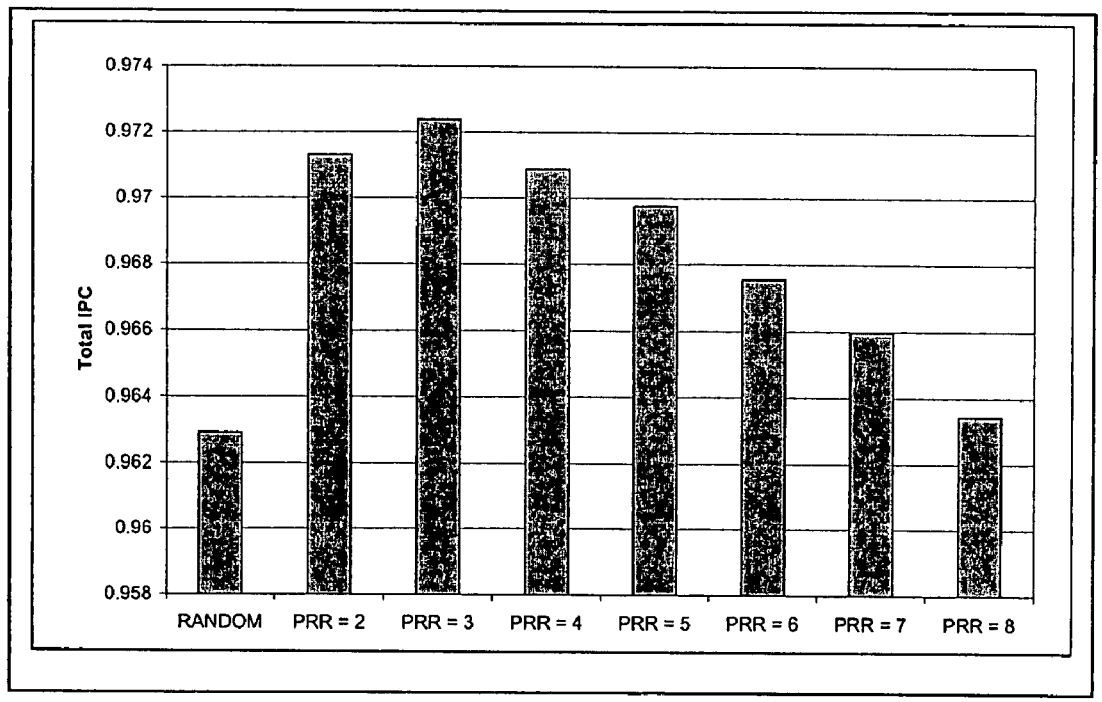
FIG. 10 is a chart illustrating the total instructions per cycle (IPC) of a processor core executing a high priority thread and a low priority thread, when using the priority-driven random replacement scheme of one embodiment of the present invention for a fully associative micro data TLB.

Finally, FIG. 10 shows the total IPC or throughput of the SMT processor core for all schemes. Although the changes in IPC numbers are quite small, it is important to explain the underlying behaviour of this graph. The traditional random scheme has the lowest IPC. As the randomly-generated indices in PRR grow up, so does the total IPC up to 3 indices. After that, the total IPC declines. As stated with reference to FIG. 8, the slope of HP thread speedup drops after 3 entries (i.e. the execution time reduction rate slows down), and also the CPI of the LP thread increases steadily as the number of randomly-generated indices increases (i.e. fewer number of LP instructions can be committed per cycle). The aggregate effect of these two factors is the decline of the total IPC as seen in the graph after 3 indices.

Consequently, for the particular example considered, the optimal number of randomly-generated indices lies between 2 and 4 when considering the HP thread speedup, the total instruction throughput and the hardware cost of the PRR scheme. For instance, the PRR scheme accelerates the HP thread by about 9% and improves the total instruction throughput by 1% at a cost of 2 extra decoders, the PBV register and a multiplexer for 3 randomly-generated indices.

From the above description of embodiments of the present invention, it will be appreciated that such embodiments provide a simple random replacement mechanism, but where the probability of replacing an entry belonging to a low priority program thread is higher than the probability of replacing an entry belonging to a high priority program thread, thereby enabling the performance of the high priority program thread to be improved when compared with a typical prior art random replacement scheme. Such a mechanism can also give potentially higher processor throughput, and requires only a small amount of extra hardware when compared with a typical prior art random replacement scheme.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A data processing apparatus comprising:
   processing circuitry configured to execute multiple program threads including at least one high priority program thread and at least one lower priority program thread;
   a storage unit shared between the multiple program threads and comprising multiple entries for storing information for reference by the processing circuitry when executing said program threads;
   a record identifying for each entry whether the information stored in that entry is associated with said at least one high priority program thread or with said at least one lower priority program thread; and
   replacement circuitry, responsive to a predetermined event, configured to select a victim entry whose stored information is to be replaced, the replacement circuitry firstly performing a candidate generation operation to identify a plurality of randomly selected candidate entries from said multiple entries, and secondly referencing said record in order to preferentially select as the victim entry one of said candidate entries whose stored information is associated with said at least one lower priority program thread.

2. A data processing apparatus as claimed in claim 1, wherein:
   if at least one of said plurality of candidate entries is associated with said at least one lower priority program thread, the replacement circuitry selects as the victim entry one of said candidate entries associated with said at least one lower priority program thread; and
   only if all candidate entries are associated with said at least one high priority program thread, the replacement circuitry selects as the victim entry one of said candidate entries associated with said at least one high priority program thread.

3. A data processing apparatus as claimed in claim 1, wherein said record maintains a field for each entry of said storage unit, each field being set to identify that the associated entry stores information associated with said at least one high priority program thread and being cleared to identify that the associated entry stores information associated with said at least one lower priority program thread.

4. A data processing apparatus as claimed in claim 3, wherein when information is written into an entry of the storage unit, the associated field in the record is set or cleared dependent on whether that entry is being written to as a result of execution of the at least one high priority program thread or the at least one lower priority program thread.

5. A data processing apparatus as claimed in claim 3, wherein each field is a single bit field.

6. A data processing apparatus as claimed in claim 1, wherein the storage unit has a set associative structure and the record comprises a sub-record for each set of the storage unit, the replacement circuitry being responsive to said predetermined event to select the victim entry from a specified set, and to reference the sub-record associated with that specified set when selecting the victim entry.

7. A data processing apparatus as claimed in claim 1, wherein the replacement circuitry comprises:
 index generation circuitry for generating a plurality of indices, each index identifying one of said candidate entries; and
 selection circuitry for receiving as inputs said plurality of indices and for outputting one of said indices as an identifier for the victim entry;
 the record being referenced based on said plurality of indices in order to control the selection circuitry.

8. A data processing apparatus as claimed in claim 7, further comprising:
 random number generator circuitry for generating at least one true random or pseudo random number;
 said index generation circuitry comprising a plurality of index generation units, each index generation unit receiving a true random or pseudo random number input from the random number generator circuitry and generating an index therefrom.

9. A data processing apparatus as claimed in claim 1, wherein the storage unit comprises a cache for storing data for access by the processing circuitry when executing said program threads.

10. A data processing apparatus as claimed in claim 1, wherein the storage unit comprises a cache for storing instructions required for said program threads.

11. A data processing apparatus as claimed in claim 1, wherein the storage unit comprises an instruction translation lookaside buffer for storing instruction access control information.

12. A data processing apparatus as claimed in claim 1, wherein the storage unit comprises a data translation lookaside buffer for storing data access control information.

13. A data processing apparatus as claimed in claim 1, wherein the storage unit comprises a branch target buffer for storing target addresses of branch instructions.

14. A data processing apparatus as claimed in claim 1, wherein said processing circuitry comprises a processing unit executing said multiple program threads.

15. A data processing apparatus as claimed in claim 1, wherein said processing circuitry comprises a plurality of processing units, each processing unit executing at least one program thread.

16. A data processing apparatus as claimed in claim 1, wherein the processing circuitry causes a lookup operation to be performed in said storage unit when seeking to access specified information, and said predetermined event is a determination that the specified information is not stored in the storage unit.

17. A method of operating a data processing apparatus to select a victim entry of a storage unit whose stored information is to be replaced, the data processing apparatus comprising processing circuitry configured to execute multiple program threads including at least one high priority program thread and at least one lower priority program thread, the storage unit being shared between the multiple program threads and comprising multiple entries for storing information for reference by the processing circuitry when executing said program threads, the method comprising the steps of:
 maintaining a record identifying for each entry whether the information stored in that entry is associated with said at least one high priority program thread or with said at least one lower priority program thread; and
 responsive to a predetermined event, selecting a victim entry whose stored information is to be replaced by:
 firstly, performing a candidate generation operation to identify a plurality of randomly selected candidate entries from said multiple entries; and
 secondly, referencing said record in order to preferentially select as the victim entry one of said candidate entries whose stored information is associated with said at least one lower priority program thread.

18. A data processing apparatus comprising:
 processing means for executing multiple program threads including at least one high priority program thread and at least one lower priority program thread;
 a storage means shared between the multiple program threads and comprising multiple entry means for storing information for reference by the processing means when executing said program threads;
 a record means for identifying for each entry means whether the information stored in that entry means is associated with said at least one high priority program thread or with said at least one lower priority program thread; and
 replacement means, responsive to a predetermined event, for selecting a victim entry means whose stored information is to be replaced, the replacement means for firstly performing a candidate generation operation to identify a plurality of randomly selected candidate entry means from said multiple entries, and secondly for referencing said record means in order to preferentially select as the victim entry means one of said candidate entry means whose stored information is associated with said at least one lower priority program thread.

* * * * *